US010885348B2

(12) United States Patent
Iwamoto

(10) Patent No.: US 10,885,348 B2
(45) Date of Patent: Jan. 5, 2021

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventor: Kazunari Iwamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 16/203,396

(22) Filed: Nov. 28, 2018

(65) Prior Publication Data

US 2019/0171887 A1 Jun. 6, 2019

(30) Foreign Application Priority Data

Dec. 5, 2017 (JP) ................................ 2017-233227

(51) Int. Cl.

*G06K 9/00* (2006.01)
*G06K 9/32* (2006.01)
*G06T 7/246* (2017.01)
*H04N 5/232* (2006.01)

(52) U.S. Cl.

CPC ....... *G06K 9/00771* (2013.01); *G06K 9/3233* (2013.01); *G06T 7/246* (2017.01); *H04N 5/23206* (2013.01); *H04N 5/23218* (2018.08); *H04N 5/23238* (2013.01); *G06T 2207/30242* (2013.01)

(58) Field of Classification Search

CPC ......................... G06K 9/00771; G06K 9/3233
See application file for complete search history.

(56) References Cited

U.S. PATENT DOCUMENTS

2017/0104915 A1 4/2017 Adachi .............. H04N 5/23206

FOREIGN PATENT DOCUMENTS

| | | | | |
|---|---|---|---|---|
| EP | 2310981 | * | 4/2011 | ......... G06K 9/00771 |
| JP | 2017-073670 | | 4/2017 | |
| WO | 2010/004514 | | 1/2010 | |

OTHER PUBLICATIONS

Johansson, Martin Lars Svante, "Image processing for pedestrian detection using a high mounted wideangle camera", Master of Science Thesis in the Master's Degree Programme, Applied Physics, Chalmers University of Technology, May 2014, retrieved from URL:http://publications.lib.chalmers.se/records/fulltext/202800/202800.pdf.

Extended European Search Report dated Apr. 17, 2019 in counterpart EP Application 18209992.9.

* cited by examiner

*Primary Examiner* — Tuan H Nguyen
(74) *Attorney, Agent, or Firm* — Venable LLP

(57) ABSTRACT

An information processing device according to one embodiment of the present invention includes: an acquisition unit that acquires a captured image; and an output unit that outputs a detection result of a subject detection process based on an image feature, which is for a region where subject detection based on an image feature of the captured image is performed, and a detection result of a subject detection process based on a factor other than an image feature, which is for a region other than the region where the subject detection based on the image feature of the captured image is performed.

16 Claims, 12 Drawing Sheets

110
IMAGING DEVICE
150
120
CLIENT DEVICE
130
INPUT DEVICE
140
DISPLAY DEVICE

INFORMATION PROCESSING DEVICE, INFORMATION PROCESSING METHOD, AND STORAGE MEDIUM

BACKGROUND OF THE INVENTION

Field of the Invention

The present invention relates to an information processing device, an information processing method, and a storage medium.

Description of the Related Art

A technology of detecting a particular subject such as a person, a vehicle, or the like from a captured image in accordance with an image feature is known. In such a technology, however, it is known that the detection accuracy decreases depending on a capturing angle of an object that is a subject. This is because the image feature of an object, which is a subject, may change in accordance with a capturing angle. In general, in a subject detection technology based on an image feature, a smaller capturing angle of an object, which is a subject, tends to improve detection accuracy. This is because an image feature is generated by using a subject included in a captured image of a small capturing angle as learning data. By using a subject included in a captured image of a large capturing angle as learning data, it is possible detect a subject without reduction in detection accuracy even if the capturing angle is much larger. However, it is difficult to collect subject images included in a captured image of a large capturing angle because of the few number thereof. It is therefore difficult for a subject detection technology based on many image features to detect a subject included in a captured image of a large capturing angle. As discussed above, the subject detection technology based on an image feature has strong and weak points in subject detection in a region within a captured image. Japanese Patent Application Laid-Open No. 2017-073670 discloses a method in which a region where a subject is easily detected is displayed superimposed on an image.

In the conventional technology disclosed in Japanese Patent Application Laid-Open No. 2017-073670, however, a region where a subject is easily detected is merely superimposed on an image and displayed, and thus the subject detection accuracy is still low in a region where subject detection is difficult.

SUMMARY OF THE INVENTION

An information processing device of the present invention includes: an acquisition unit that acquires a captured image; and an output unit that outputs a detection result of a subject detection process based on an image feature, which is for a region where subject detection based on an image feature of the captured image is performed, and a detection result of a subject detection process based on a factor other than an image feature, which is for a region other than the region where the subject detection based on an image feature of the captured image is performed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

In the present embodiment, a subject detection system (hereinafter, referred to as a system) divides a captured image into a region where subject detection based on an image feature is performed and a region where subject detection based on a factor other than an image feature is performed. The system then performs subject detection corresponding to the divided regions, respectively, and outputs a result of the detection. A flow of information processing in the present embodiment will be described below.

Figure 1:
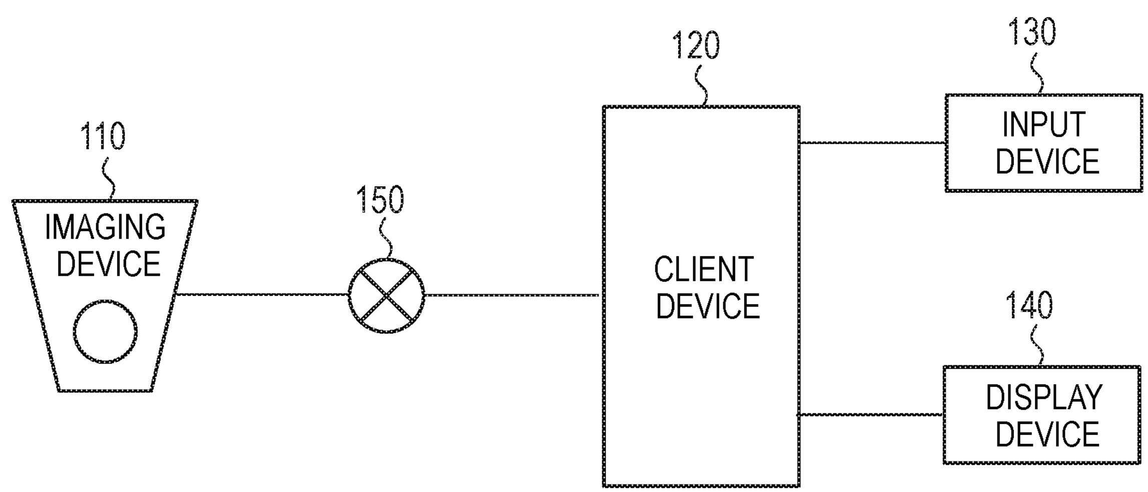
FIG. 1 is a diagram illustrating an example of a system configuration of a subject detection system.

FIG. 1 is a diagram illustrating an example of a system configuration of the system.

The system of the present embodiment includes an imaging device 110 and a client device 120. The imaging device 110 and the client device 120 are connected so as to be able to communicate with each other via a network 150. The client device 120 is connected to an input device 130 and a display device 140. The client device 120 is an example of an information processing device.

The imaging device 110 is an imaging device such as a network camera that performs capturing. The client device 120 is an information processing device such as a personal computer, a server device, a tablet device, or the like that drives the imaging device 110, acquires a captured image, detects a moving object with respect to the acquired image, superimposes a mask, or the like. The input device 130 is an input device formed of a mouse, a keyboard, or the like. The display device 140 is a display device such as a monitor that displays an image output by the client device 120. In the present embodiment, the client device 120, the input device 130, and the display device 140 are separate devices. However, the client device 120 and the display device 140 may be integrated, or the input device 130 and the display device

140 may be integrated, for example. Further, the client device 120, the input device 130, and the display device 140 may be integrated.

The network 150 is a network connecting the imaging device 110 to the client device 120. The network 150 is formed of a plurality of routers, switches, cables, or the like that conform to a communication specification such as Ethernet (Registered Trademark), for example. In the present embodiment, the network 150 may be any network that enables communication between the imaging device 110 and the client device 120, and the communication specification, the size, and the configuration thereof are not particularly limited. For example, the network 150 may be formed of the Internet, a wired Local Area Network (LAN), a wireless LAN, a Wide Area Network (WAN), or the like.

Figure 2A:
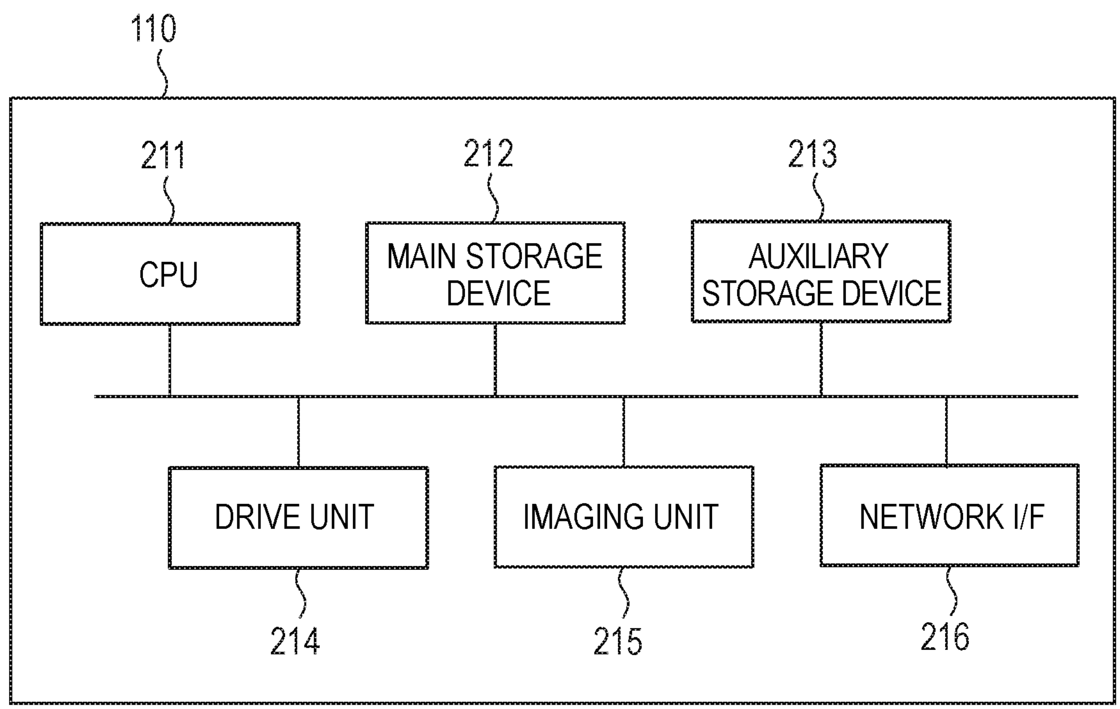
FIG. 2A and FIG. 2B are diagrams illustrating an example of the hardware configuration of an imaging device and a client device.

FIG. 2A is a diagram illustrating an example of the hardware configuration of the imaging device 110.

The imaging device 110 includes a CPU 211, a main storage device 212, an auxiliary storage device 213, a drive device 214, an imaging unit 215, and a network I/F 216 as a hardware configuration. Respective components are connected so as to be able to communicate with each other via a system bus 217.

The CPU 211 is a central processing unit that controls the operation of the imaging device 110. The main storage device 212 is a storage device such as a random access memory (RAM) that functions as a work area of the CPU 211 and a temporary area for storing data. The auxiliary storage device 213 is a storage device such as a hard disk drive (HDD), a read-only memory (ROM), a solid state drive (SSD), or the like that stores various programs, various setting data, or the like.

The drive unit 214 is a drive unit that drives the imaging device 110 to change the attitude or the like of the imaging device 110 and change the capturing direction and the image angle of the imaging unit 215. The imaging unit 215 is an imaging unit that has an image pickup device and an optical system and forms an image of a subject on the image pickup device with the capturing center at the intersecting point of an optical axis of the optical system and the image pickup device. The image pickup device may be Complementary Metal-Oxide Semiconductor (CMOS), Charged Coupled Device (CCD), or the like. The network I/F 216 is an interface used in communication with an external device such as the client device 120 via the network 150.

Figure 3A:
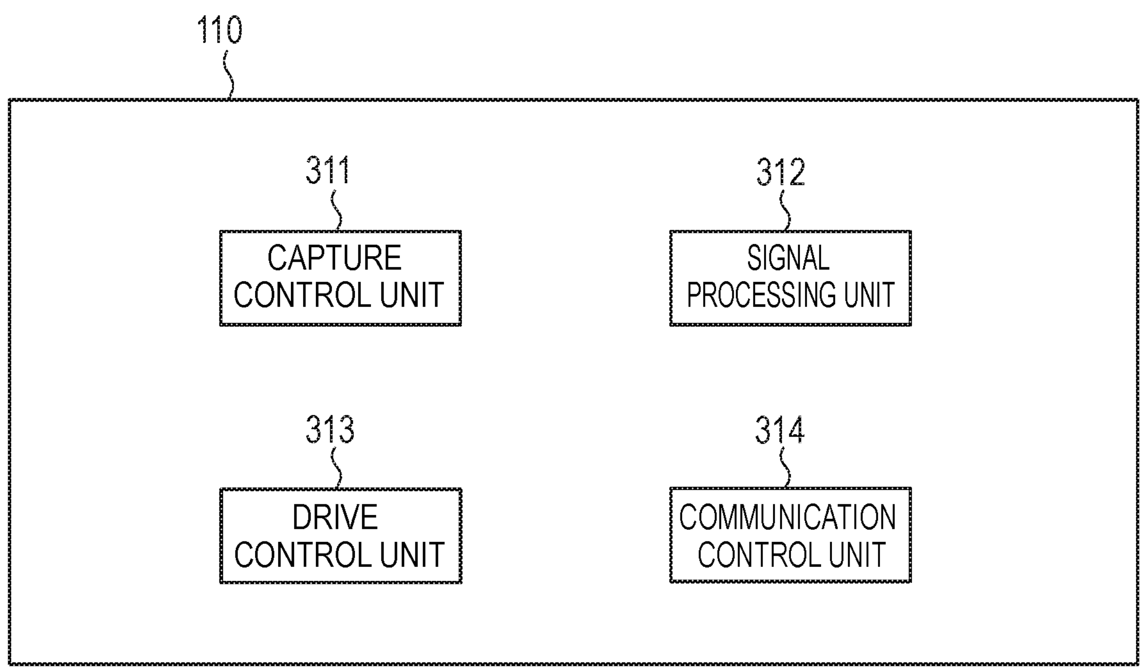
FIG. 3A and FIG. 3B are diagrams illustrating an example of a functional configuration of an imaging device and a client device.

When the CPU 211 executes a process in accordance with a program stored in the auxiliary storage device 213, the function of the imaging device 110 and the process in the imaging device 110 described later with FIG. 3A are implemented.

Figure 2B:
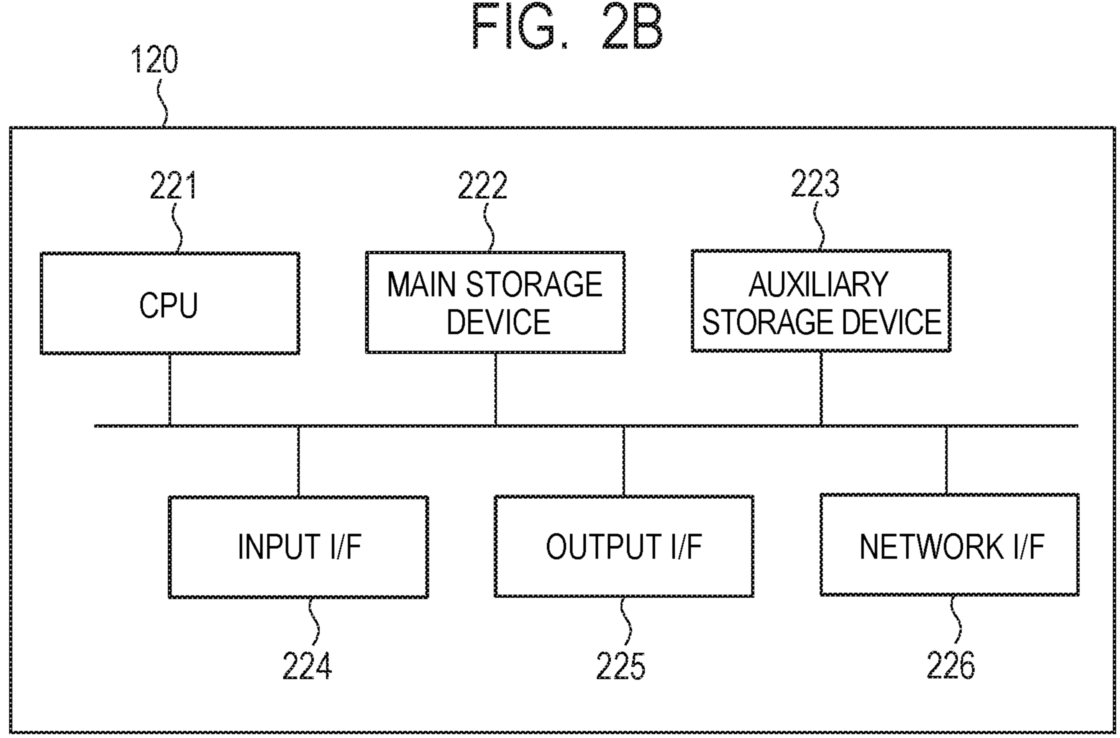

FIG. 2B is a diagram illustrating an example of a hardware configuration of the client device 120.

The client device 120 includes a CPU 221, a main storage device 222, an auxiliary storage device 223, an input I/F device 224, an output I/F 225, and a network I/F 226 as a hardware configuration. Respective components are connected so as to be able to communicate with each other via a system bus 227.

The CPU 221 is a central processing unit that controls the operation of the client device 120. The main storage device 222 is a storage device such as a RAM that functions as a work area of the CPU 221 and a temporary area for storing data. The auxiliary storage device 223 is a storage device such as an HDD, a ROM, an SSD, or the like that stores various programs, various setting data, or the like.

The input I/F 224 is an interface used when accepting input from the input device 130 or the like. The output I/F 225 is an interface used for outputting information to the display device 140 or the like. The network I/F 216 is an interface used for communication with the external device such as the imaging device 110 via the network 150.

When the CPU 221 executes a process in accordance with a program stored in the auxiliary storage device 223, the function of the client device 120 described later with FIG. 3B and the process of the client device 120 such as the process in the flowcharts described later with FIG. 4 and FIG. 7 or the like are implemented.

FIG. 3A is a diagram illustrating an example of a function configuration of the imaging device 110.

The imaging device 110 includes a capture control unit 311, a signal processing unit 312, a drive control unit 313, and a communication control unit 314 as a function configuration.

The capture control unit 311 captures a surrounding environment through the imaging unit 215. The signal processing unit 312 processes an image captured by the capture control unit 311. For example, the signal processing unit 312 encodes an image captured by the capture control unit 311. In a case of a static image, the signal processing unit 312 encodes an image by using an encoding scheme such as Joint Photographic Experts Group (JPEG), for example. Further, in a case of a moving image, the signal processing unit 312 encodes an image by using an encoding scheme such as H. 264/MPEG-4 AVC, a High Efficiency Video Coding (HEVC) encoding scheme. Further, the signal processing unit 312 may encode an image by using an encoding scheme that is selected by a user via an operating unit of the imaging device 110 out of a plurality of preset encoding schemes, for example.

The drive control unit 313 performs control to change the capturing direction and the image angle of the capture control unit 311 via the drive unit 214. However, the drive control unit 313 may change any one of the capturing direction and the image angle of the capture control unit 311. Further, the imaging direction and the image angle of the capture control unit 311 may be fixed. The communication control unit 314 transmits an image captured by the capture control unit 311 and processed by the signal processing unit 312 to the client device 120 via the network I/F 216. Further, the communication control unit 314 receives a control instruction to the imaging device 110 from the client device 120 via the network I/F 216.

Figure 3B:
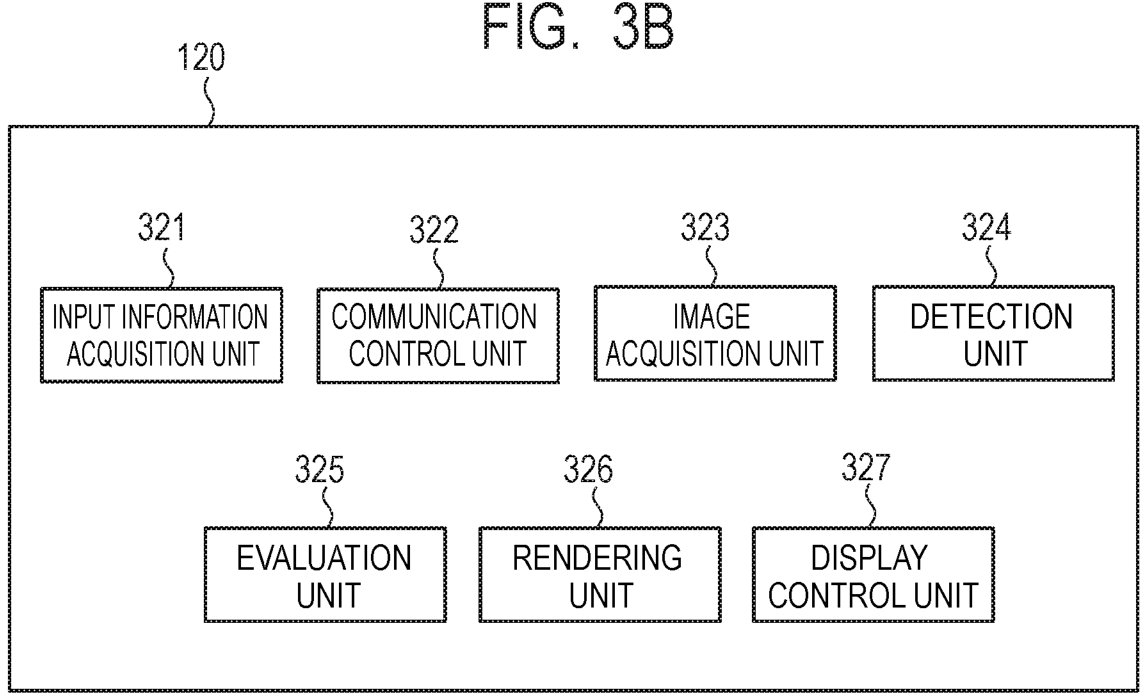

FIG. 3B is a diagram illustrating an example of a functional configuration of the client device 120.

The client device 120 includes an input information acquisition unit 321, a communication control unit 322, an image acquisition unit 323, a detection unit 324, an evaluation unit 325, a rendering unit 326, and a display control unit 327 as a function configuration. The input information acquisition unit 321 accepts a user input via the input device 130. The communication control unit 322 receives an image transmitted from the imaging device 110 via the network 150. Further, the communication control unit 322 transmits a control instruction to the imaging device 110 via the network 150. The image acquisition unit 323 acquires an image captured by the imaging device 110 from the imaging device 110 via the communication control unit 322 as an object image of a subject detection process. Further, the image acquisition unit 323 may acquire an image stored in the auxiliary storage device 223 as an object image of a subject detection process.

The evaluation unit 325 determines whether a region of an image acquired by the image acquisition unit 323 is a region where subject detection based on an image feature is performed or a region where subject detection based on a factor other than an image feature is performed. The detection unit 324 performs a subject detection process based on an image feature and subject detection based on a factor other than an image feature on the image acquired by the image acquisition unit 323. The rendering unit 326 superimposes a subject detected by the detection unit 324 on a captured image. The display control unit 327 outputs, to the display device 140, the captured image on which a subject detection result is superimposed.

Figure 4:
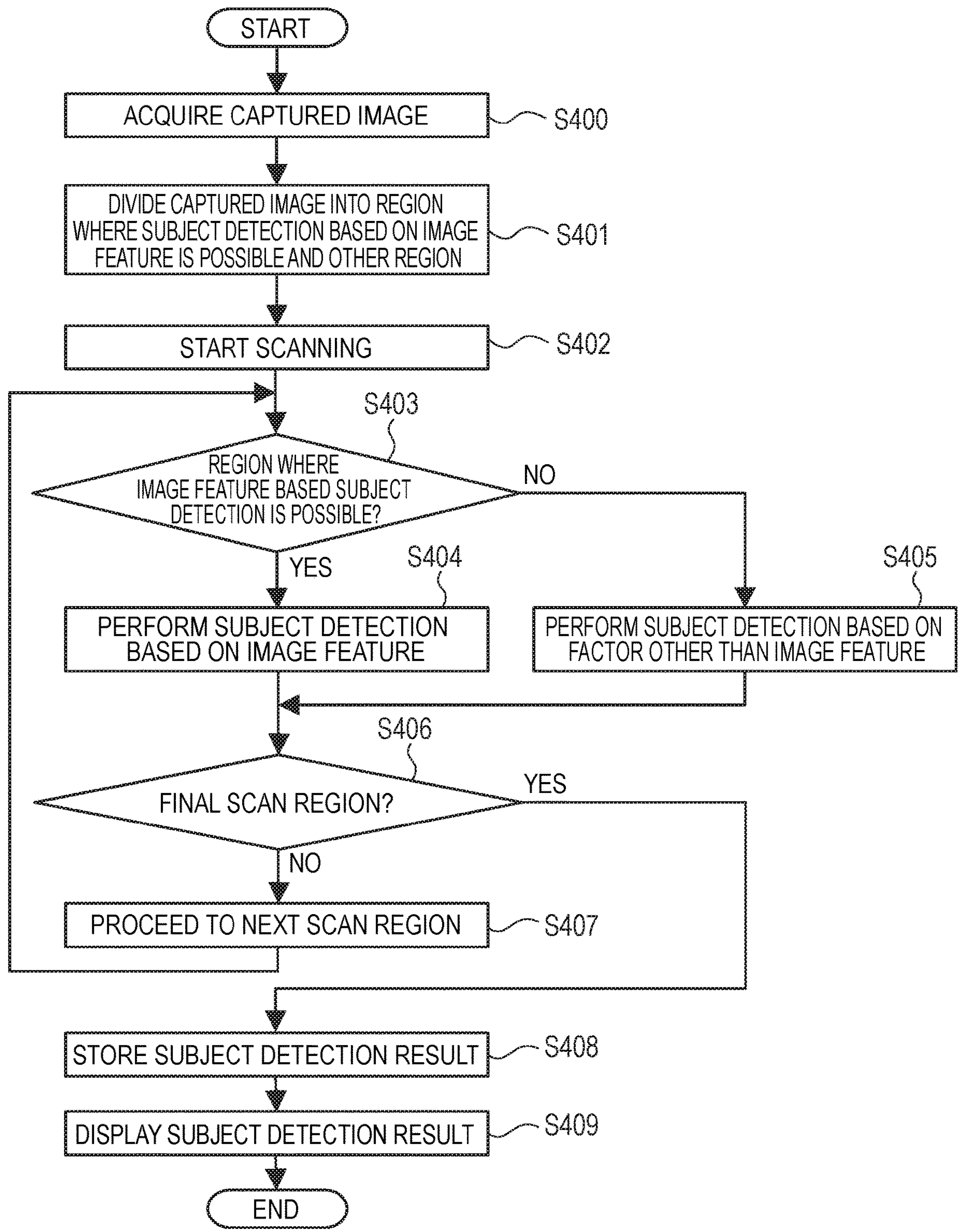
FIG. 4 is a flowchart illustrating an example of a subject detection process of a first embodiment.

FIG. 4 is a flowchart illustrating an example of a subject detection process of the first embodiment. A process in which the client device 120 acquires an image, detects a subject in the acquired image, and outputs an image on which a detection result is superimposed will be described by using FIG. 4.

In step S400, the image acquisition unit 323 acquires an image captured by the imaging device 110 from the imaging device 110 via the communication control unit 322. In the following description, an image captured by the imaging device 110 acquired in step S400 is denoted as a captured image.

Figure 5:
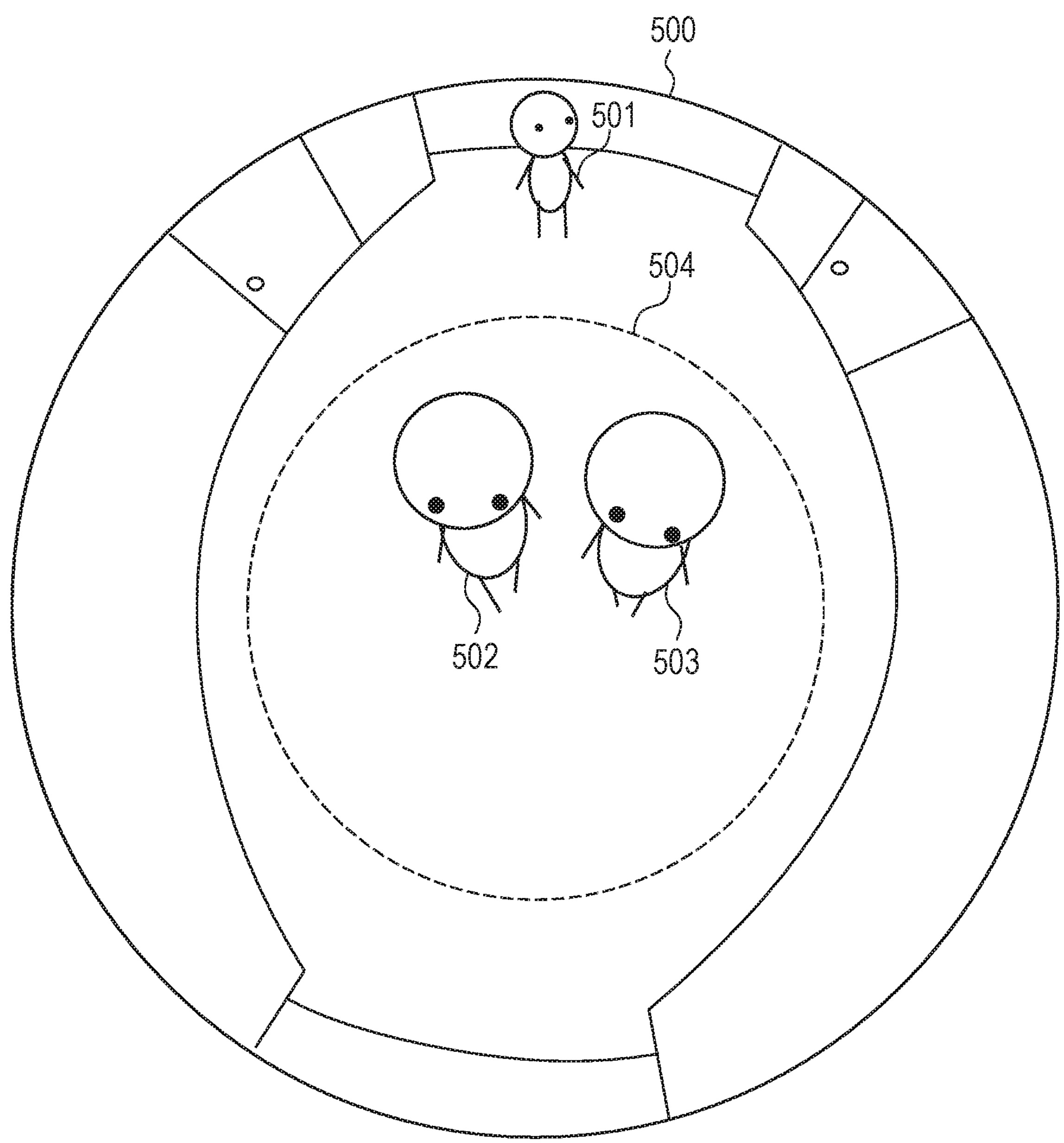
FIG. 5 is a diagram illustrating an example of a captured image captured by an imaging device.

FIG. 5 is a diagram illustrating an example of a captured image captured by the imaging device 110. A captured image 500 illustrates a captured image captured by the imaging device 110. Subjects 501 to 503 represent subjects to be detected in an environment in the captured image 500. Further, a boundary 504 represents a boundary between a region where subject detection based on an image feature is possible and the other region, as described later. In the present embodiment, while the captured image 500 is an image captured by using an imaging device having a view angle of 180 degrees, the embodiment is not limited thereto. The captured image 500 may be an image captured by using an imaging device having a view angle other than 180 degrees.

In the present embodiment, the client device 120 receives a live video captured in real time from the imaging device 110 and performs the process of FIG. 4 on each frame of the received live video (moving image). However, the client device 120 may perform the process of FIG. 4 on a static image or each frame of a moving image stored in the auxiliary storage device 213 in the imaging device 110, for example. Further, the client device 120 may perform the process of FIG. 4 on a static image or each frame of a moving image stored in the auxiliary storage device 223 in the client device 120. Further, the client device 120 may access an external recording server and perform the process illustrated in FIG. 4 on a static image or each frame of a moving image stored in the recording server.

In step S401, the detection unit 324 divides a captured image into a region where subject detection based on an image feature is possible and the other region. The detection unit 324 performs dividing in accordance with a capturing angle of each region. More specifically, the detection unit 324 determines that a region of interest is a region where subject detection based on an image feature is possible if the capturing angle is less than or equal to 50 degrees and determines that a region of interest is a region where subject detection based on an image feature is not possible if the capturing angle is greater than 50 degrees. That is, the boundary 504 represents a line on which the capturing angle is 50 degrees, the outside of the boundary 504 represents a region where subject detection based on an image feature is possible, and the inside of the boundary 504 represents a region other than the region where subject detection based on an image feature is possible.

However, the embodiment is not limited the above. The detection unit 324 may set a boundary in a captured image in accordance with a user operation input via the input device 130 or the like on the captured image displayed on the display device 140 and divide the captured image into a region where subject detection based on an image feature is possible and the other region. Further, the image acquisition unit 323 acquires a captured image in which subjects intended to be detected are arranged. The detection unit 324 may then perform, on the acquired captured image, subject detection based on an image feature and divide the captured image into a region where a subject can be detected and a region where no subject can be detected.

In step S402, the detection unit 324 starts a subject detection process. The detection unit 324 switches a region of interest while raster-scanning the captured image and performs subject detection on the region of interest.

In step S403, the detection unit 324 determines whether or not subject detection based on an image feature is possible on the region of interest in accordance with a result of the region division performed in step S401. If it is determined that the region of interest is a region where subject detection based on an image feature is possible, the detection unit 324 proceeds to step S404, and if it is determined that the region of interest is a region where subject detection based on an image feature is not possible, the detection unit 324 proceeds to step S405.

In step S404, the detection unit 324 performs, on the region of interest, subject detection based on an image feature. To perform subject detection based on an image feature, the detection unit 324 scales the region of interest with various sizes. Scaling enables detection of subjects with various sizes. Next, the detection unit 324 performs a raster scan of a particular size of a detection window on each scaled region of interest. At this time, the detection unit 324 calculates a feature amount of a subject in advance by using learning data and determines that a subject is included when an error between a feature amount acquired within a detection window at the time of scan and a feature amount based on the learning data described above is less than a threshold. Further, while the detection unit 324 performs scaling for each region of interest, the embodiment is not limited thereto. The detection unit 324 may perform a scaling process on the captured image 500 before performing a subject detection process and prepare a scaling image for each region in advance.

In step S405, the detection unit 324 performs, on the region of interest, subject detection based on a factor other than an image feature. The detection unit 324 performs subject detection by using a moving-object detection. For example, the detection unit 324 uses a background difference for detection of a moving object. That is, the detection unit 324 calculates a difference in a luminance value between a background image acquired in advance and the captured image acquired in step S400 and determines a region where the difference exceeds a threshold as a moving object. However, a method of detecting a subject is not limited thereto. The detection unit 324 may handle RGB values as three-dimensional coordinates and measure a distance between the RGB values of a background image and the RGB values of a captured image as a difference. Further, without limited to the use of a background difference, the detection unit 324 may calculate a moving direction of respective coordinates within an image like optical flow and detect a moving object. Further, the detection unit 324 may not use moving-object detection as the subject detection based on a factor other than an image feature. For example, the detection unit 324 may determine a portion having an extreme value as a subject in accordance with a distance image generated by using a distance sensor. That is, the subject detection based on a factor other than an image feature is defined as performing subject detection in accordance with information other than a pixel value of a pixel included in an object image from which a subject is detected.

In steps S404 and S405, if it is determined that there is a subject, the detection unit 324 stores the region of interest and the size of the detected subject in the main storage device 222. However, the embodiment is not limited thereto, and the detection unit 324 may store the region of interest and the size of the detected subject in the auxiliary storage device 223 or may store the region of interest and the size of the detected subject in another device via the network I/F. The detection unit 324 determines the size of a subject from a result of scaling of the region of interest in step S404 and from the size of a moving object in step S405, respectively.

In step S406, the detection unit 324 determines whether or not the current scan region is the final scan region. If it is not the final scan region, the detection unit 324 proceeds to step S407 and, if it is the final scan region, proceeds to step S408.

In step S407, the detection unit 324 focuses on the next scan region and proceeds to step S403.

In step S408, the detection unit 324 stores a result of subject detection. While the detection unit 324 performs file-output to another device via the network I/F, the embodiment is not limited thereto. The detection unit 324 may store a result of subject detection in the main storage device 222 or may store a result of subject detection in the auxiliary storage device 223.

Figure 6:
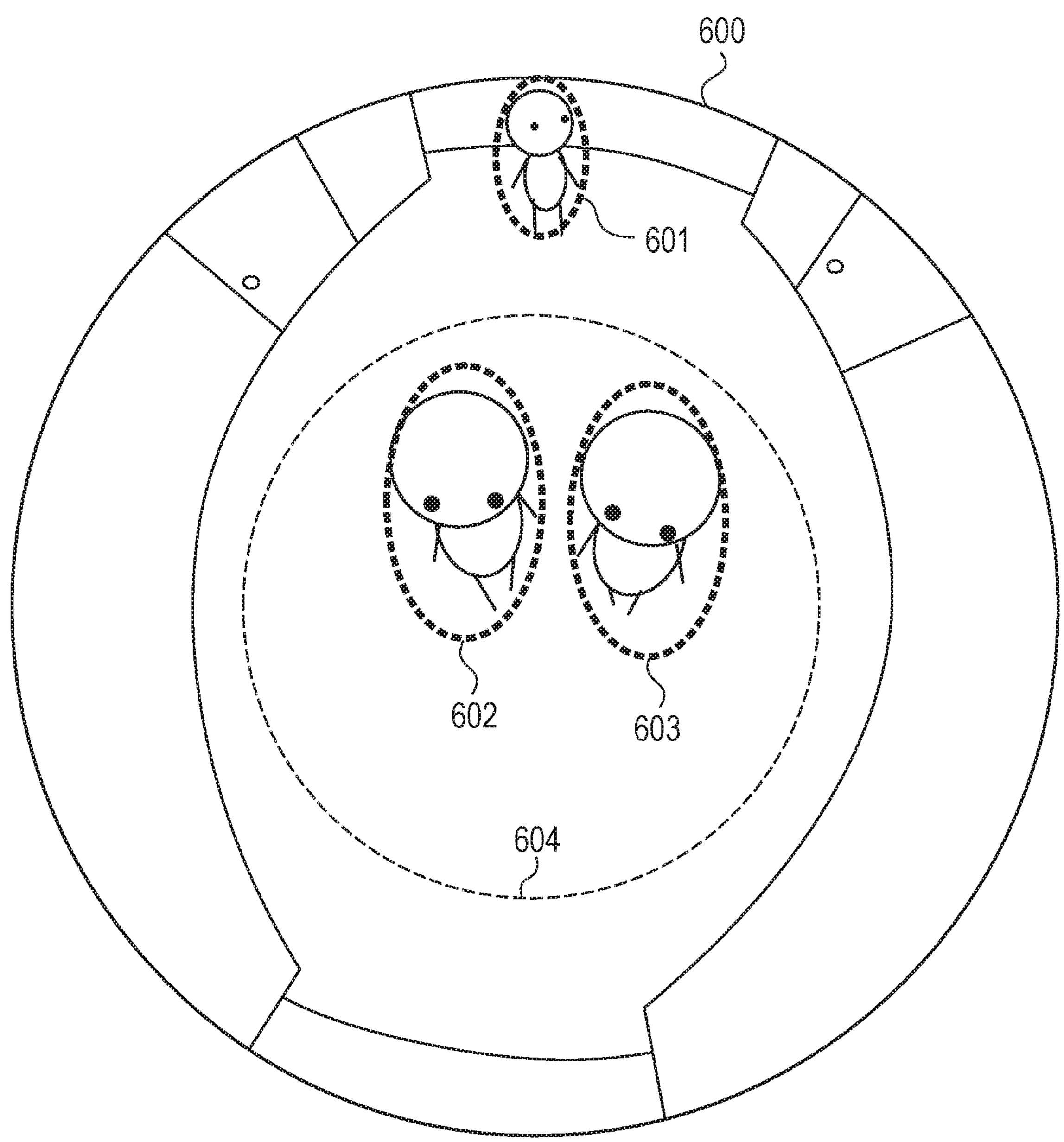
FIG. 6 is a diagram illustrating an example of a captured image on which a subject detection process has been performed.

In step S409, the display control unit 327 superimposes a result of subject detection on a captured image and outputs the superimposed image to the display device 140. FIG. 6 is a diagram illustrating an example of a captured image displayed on the display device 140 after a subject detection process is performed. A captured image 600 is a result obtained by applying the process of the flowchart illustrated in FIG. 4 to the captured image 500. Subject detection results 601 to 603 represent subject detection results superimposed on regions in which the subjects 501 to 503 are located. In the example of FIG. 6, the display control unit 327 represents a result of subject detection by using an ellipse with a dashed line. In FIG. 6 and in FIG. 8A, FIG. 8B, FIG. 9A, and FIG. 9B described later, the ellipse with the dashed line represents as a detection result, and in FIG. 8C, FIG. 8D, FIG. 9C, and FIG. 9D, the ellipse with the solid line represents a display result displayed in accordance with a detection result. However, the embodiment is not limited thereto. The display control unit 327 may represent a subject display result by using other symbols such as a triangle, a rectangle, or the like or may display a subject detection result by superimposing a character string thereon. Further, the display control unit 327 may superimpose an image representing a subject and a figure on a captured image, for example. A boundary 604 represents a boundary between a region where subject detection based on an image feature is performed and the other region. In the example of FIG. 6, the display control unit 327 represents the boundary 604 by a dashed line and superimposes the boundary 604 on a captured image. However, the embodiment is not limited thereto. The display control unit 327 may represent a boundary by using a different type of line or may represent a boundary by superimposing different colors on respective regions. Further, the display control unit 327 may superimpose a different pattern such as dots, diagonal lines, or the like.

According to the first embodiment, even when a region where subject detection based on an image feature is difficult is included in a captured image, it is possible to perform subject detection while suppressing reduction in detection accuracy. Further, according to the first embodiment, it is possible to output a detection result of a subject detection process based on an image feature, which is for a region where subject detection based on an image feature is performed, and a detection result of a subject detection process based on a factor other than an image feature, which is for a region other than the region where subject detection based on an image feature is performed. Further, a subject to be detected in a subject detection process based on an image feature of the captured image is the same type of subject as a subject to be detected in a subject detection process based on a factor other than an image feature. That is, for example, a subject to be detected in a subject detection process based on an image feature is a person, and a subject to be detected in a subject detection process based on a factor other than an image feature is also a person.

Second Embodiment

In the first embodiment, the system divides a captured image into a region where subject detection based on an image feature is performed and a region where subject detection based on a factor other than an image feature is performed and then performs corresponding subject detection on the divided regions, respectively. In each divided region in the first embodiment, however, a situation where detection accuracy is reduced may occur in the subject detection based on an image feature and the subject detection based on a factor other than an image feature, respectively. In the second embodiment, a situation where detection accuracy is reduced will be described, and a method of correcting the reduction in detection accuracy in accordance with a subject detection result of the previous frame will be described.

Since the system configuration of the system of the second embodiment is the same as that in the first embodiment, the description thereof will be omitted. Further, since the hardware configuration and the function configuration of the imaging device 110 and the client device 120 are the same as those in the first embodiment, the description thereof will be omitted.

Figure 7:
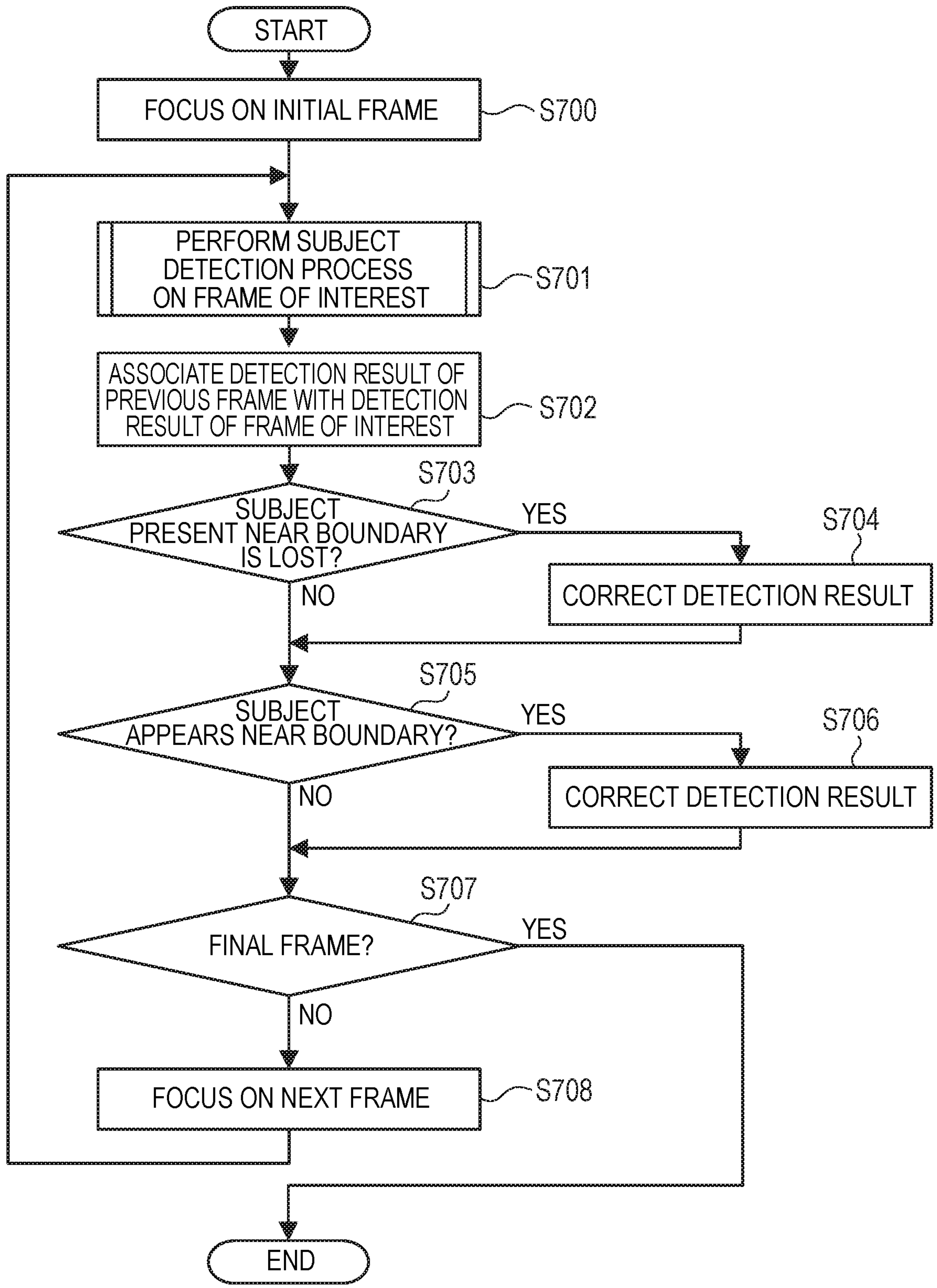
FIG. 7 is a flowchart illustrating an example of a subject detection process of a second embodiment.

FIG. 7 is a flowchart illustrating an example of a subject detection process of the second embodiment. A process in which the client device 120 acquires a plurality of captured images, detects a subject in each of the acquired captured images, and corrects a detection result in accordance with the past detection result will be described by using FIG. 7.

In step S700, the image acquisition unit 323 focuses on the initial frame of a video on which a subject detection process is intended to be performed. In the example of the second embodiment, the video in step S700 is a live video captured by the imaging device 110. However, the embodiment is not limited thereto. For example, the video in step S700 may be a recorded video stored in the imaging device 110 or the client device 120.

In step S701, the image acquisition unit 323 acquires a frame of interest from the imaging device 110 via the communication control unit 322. The detection unit 324 then performs a subject detection process on the acquired frame. In the second embodiment, the detection unit 324 performs the subject detection process (S401 to S408) described in the first embodiment.

In step S702, the detection unit 324 compares a subject detection result of the previous frame with a subject detection result of the current frame of interest and performs a matching process of associating the same subject with each other. The detection unit 324 calculates a distance between the coordinates of the subject detected in the previous frame and the coordinates of the subject detected in the frame of interest and determines, as the same subject, objects that are less than or equal to a threshold and the closest to each other. However, the embodiment is not limited thereto. For example, the detection unit 324 may perform matching of the same subject between different frames in accordance with the SIFT feature amount taking scale, rotation, or lighting change into consideration. Further, the detection unit 324 may use a different feature amount in accordance with a capturing situation.

In step S703, the detection unit 324 determines whether or not a subject detection result which has been present near the boundary 504 has disappeared from the frame of interest in accordance with a matching result in step S702. That is, the detection unit 324 determines whether or not a subject which has been present near the boundary 504 in the previous frame is absent in the frame of interest and no matching is obtained. If it is determined that the subject detection result has disappeared, the detection unit 324 proceeds to step S704 and, if the subject detection result has not disappeared, proceeds to step S705. If the shortest distance between a line indicating the boundary and the coordinates of the subject detected in the previous frame is less than a threshold, the detection unit 324 determines that the subject is near the boundary and, if the above shortest distance is greater than or equal to the threshold, determines that the subject is not near the boundary.

An example in which a subject detection result which has been present near the boundary 504 disappears will be described by using FIG. 8A to FIG. 8D and FIG. 9A to FIG. 9D.

Figure 8A:
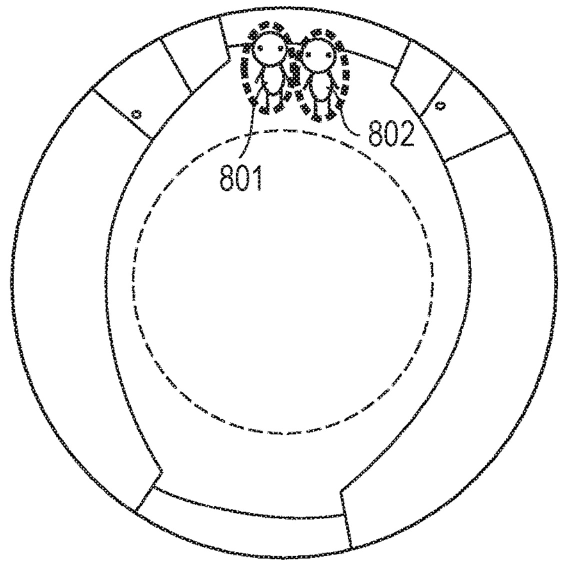
FIGS. 8A, 8B, 8C and 8D are diagrams illustrating an example of a captured image.
Figure 8C:
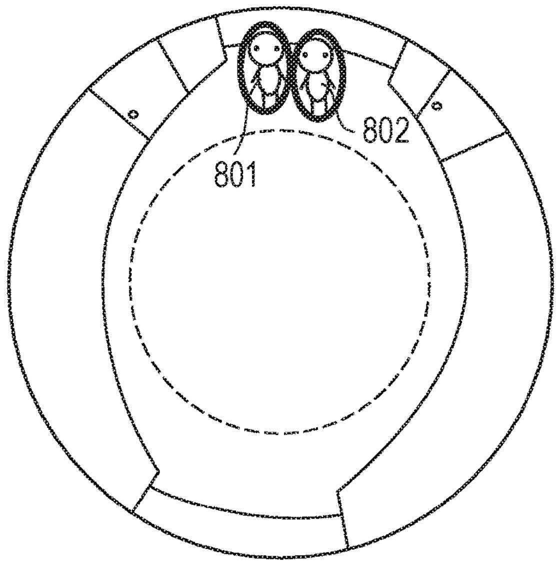
Figure 8B:
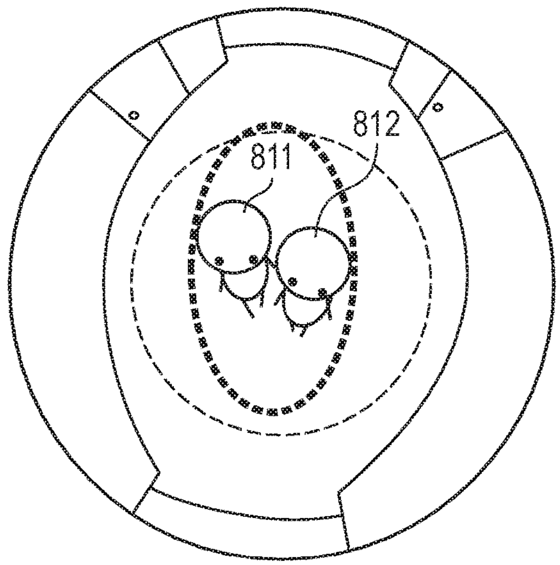

FIG. 8A and FIG. 8B are diagrams illustrating an example of a captured image when capturing a situation that two subjects walk from the upper part of an image to the lower part of the image. FIG. 8A and FIG. 8B represent captured images in certain frames, and the frame in FIG. 8A precedes to the frame in FIG. 8B. Subjects 801 and 811 are the same subject, and subjects 802 and 812 are the same subject. In this example, in FIG. 8A, two subjects are detected by subject detection using the image feature amount. In FIG. 8B, however, since the subject 811 and the subject 812 are close to each other, if subject detection based on moving-object detection is performed, the subject 811 and the subject 812 are detected as a single moving object. Thus, the number of detected subjects is one. A captured image in FIG. 8A is an example of the first captured image captured at the first timing. Further, the captured image in FIG. 8B is an example of the second captured image captured at the second timing that is different from the first timing.

Figure 9A:
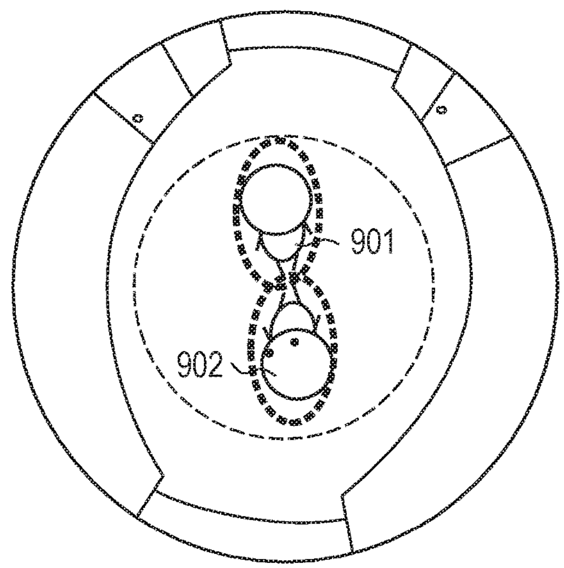
FIGS. 9A, 9B, 9C and 9D are diagrams illustrating an example of a captured image.
Figure 9C:
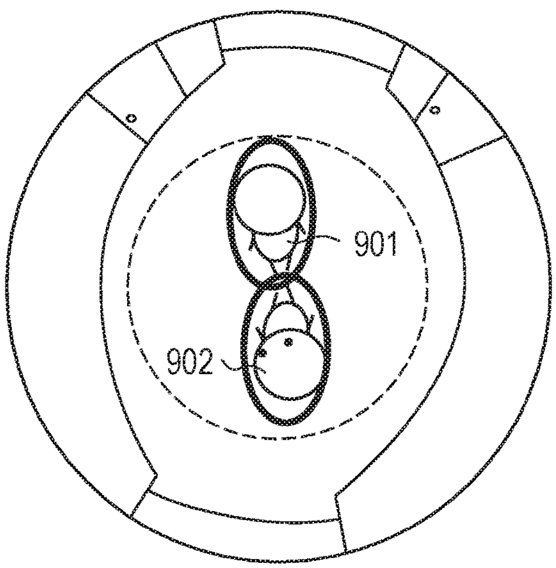
Figure 9B:
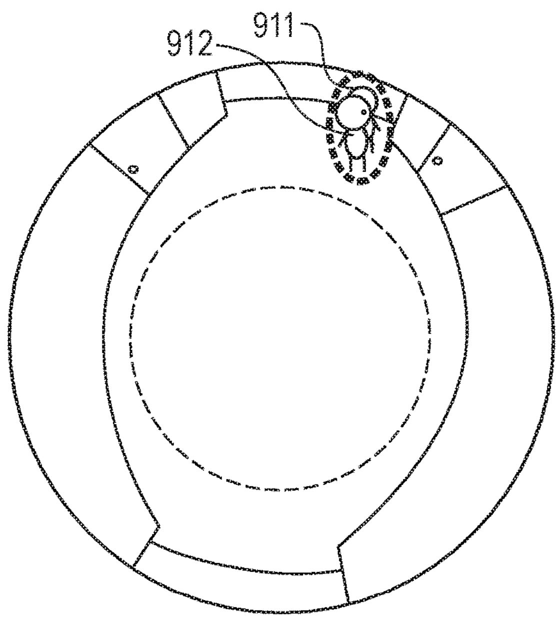

FIG. 9A and FIG. 9B are diagrams illustrating an example of a captured image when capturing a situation that two subjects walk from the center of an image to the upper part of the image. FIG. 9A and FIG. 9B represent captured images in certain frames, and the frame in FIG. 9A precedes to the frame in FIG. 9B. Subjects 901 and 911 are the same subject, and subjects 902 and 912 are the same subject. In this example, in FIG. 9A, two subjects are detected by subject detection based on moving-object detection. In FIG. 9B, however, since the subject 911 is hidden behind the subject 912, if subject detection based on an image feature is performed on the image in FIG. 9B, the subject 911 will not be detected. A captured image in FIG. 9A is an example of the first captured image captured at the first timing. Further, the captured image in FIG. 9B is an example of the second captured image captured at the second timing.

In step S704, the detection unit 324 corrects a detection result in a frame of interest. As illustrated in FIGS. 8A and 8B and FIGS. 9A and 9B, when the process moves on to step S704, two detection results are combined to one detection result. Thus, in step S704, the detection unit 324 corrects the number of detected subjects in the frame obtained before the subject disappears to the number of detected subjects in the frame of interest.

Figure 8D:
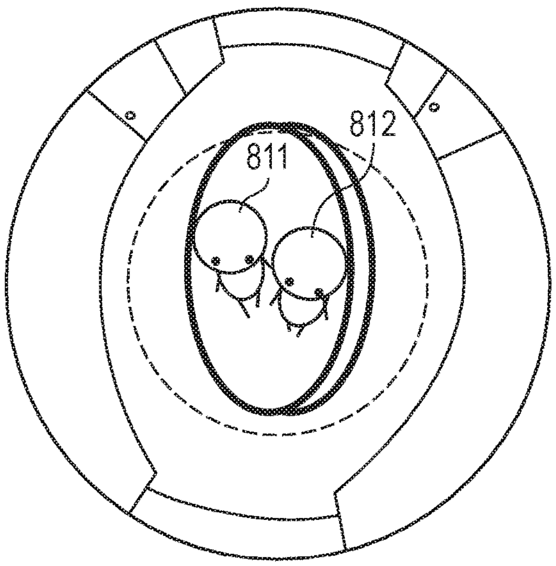

FIG. 8C is a diagram illustrating an example of a display result corresponding to FIG. 8A. Further, FIG. 8D is a diagram illustrating an example of a display result corresponding to FIG. 8B.

Figure 9D:
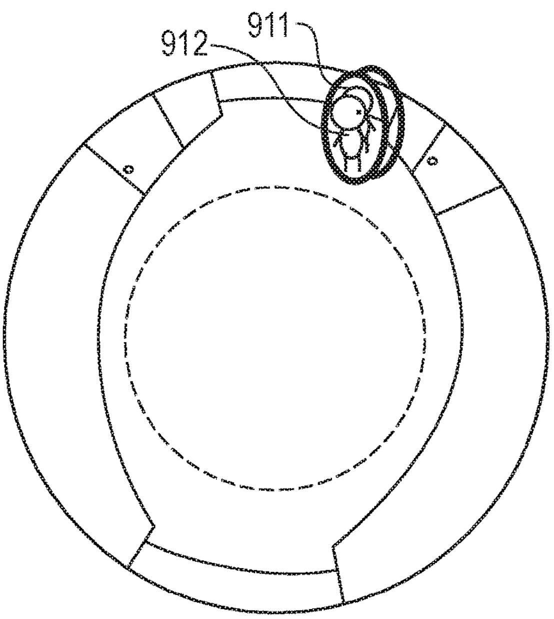

Further, FIG. 9C is a diagram illustrating an example of a display result corresponding to FIG. 9A. Further, FIG. 9D is a diagram illustrating an example of a display result corresponding to FIG. 9B.

In step S705, the detection unit 324 determines whether or not a subject detection result newly appears near the boundary 504 in the frame of interest in accordance with the matching result in step S702. That is, the detection unit 324 determines in the previous frame whether or not a subject which has been absent near the boundary 504 suddenly appears in the frame of interest and no matching is obtained. If it is determined that a subject detection result appears, the detection unit 324 proceeds to step S706 and, if not, proceeds to step S707.

An example in which a subject detection result newly appears near the boundary 504 will be described by using FIG. 10A and FIG. 10B.

Figure 10A:
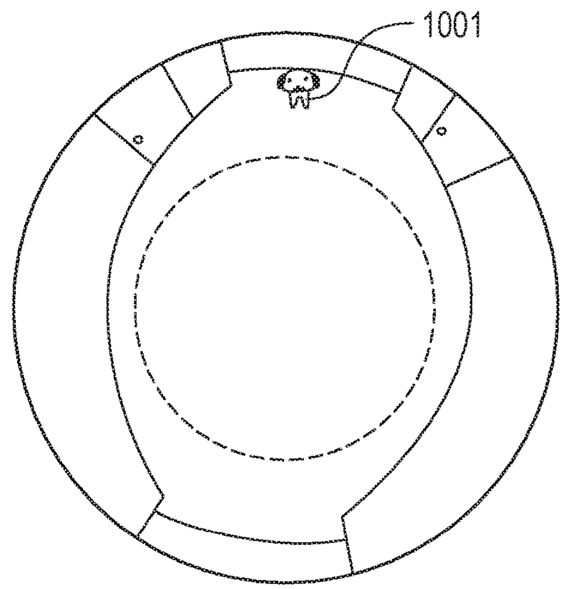
FIGS. 10A, 10B, 10C and 10D are diagrams illustrating an example of a captured image.
Figure 10C:
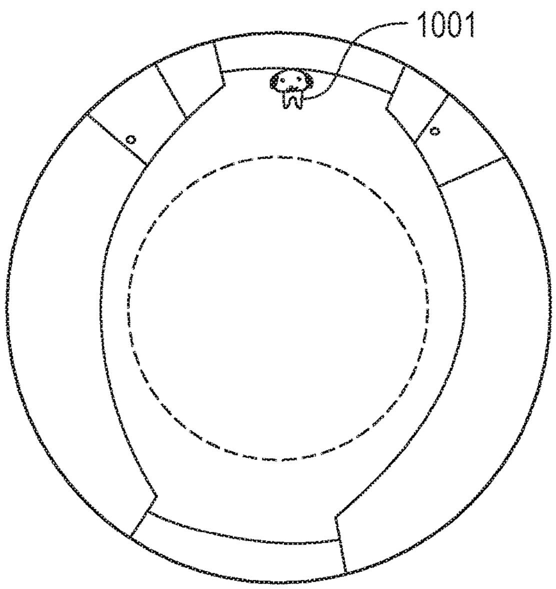
Figure 10B:
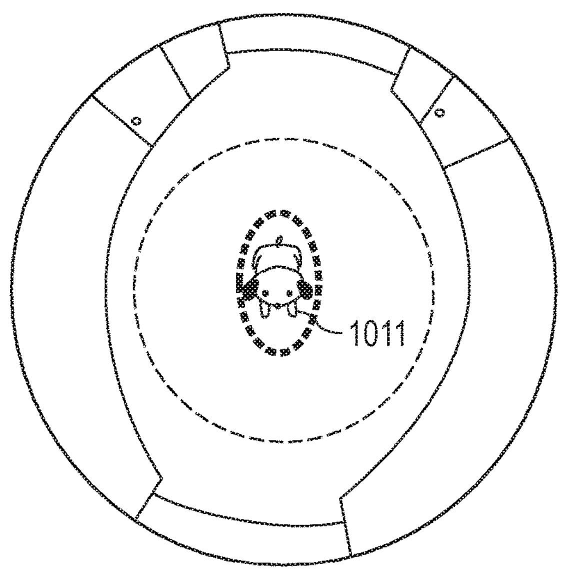

FIG. 10A and FIG. 10B are diagrams illustrating an example of a captured image when capturing a situation where a moving object other than a subject walks from the upper part of the image to the lower part of the image. FIG. 10A and FIG. 10B represent captured images in certain frames, and the frame in FIG. 10A precedes to the frame in FIG. 10B. Moving objects 1001 and 1011 are the same moving object. In this example, in FIG. 10A, even if subject detection using an image feature amount is performed, no subject is detected. In FIG. 10B, however, because subject detection based on moving-object detection is performed, the moving object 1011 is determined to be a subject. Thus, in FIG. 10B, one subject is detected despite the fact that there is no subject.

In step S706, the detection unit 324 corrects a detection result in the frame of interest. As illustrated in FIG. 10A and FIG. 10B, when the process moves on to step S706, a subject which is not present will be detected. Thus, in step S706, the detection unit 324 corrects the number of detected subjects in the frame obtained before the subject appears to the number of detected subjects in the frame of interest.

Figure 10D:
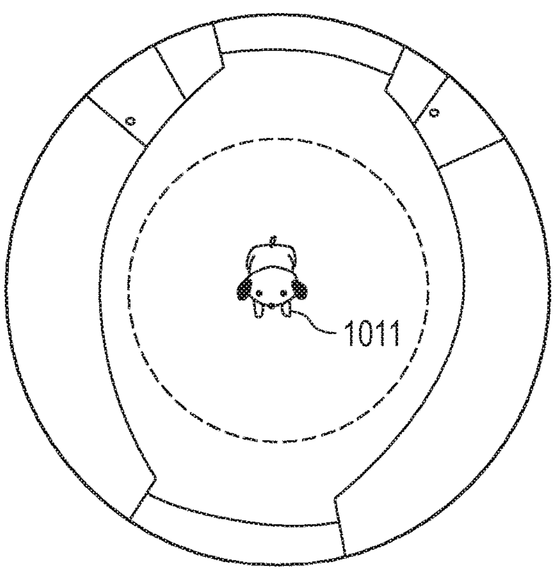

FIG. 10C is a diagram illustrating an example of a display result corresponding to FIG. 8A. Further, FIG. 10D is a diagram illustrating an example of a display result corresponding to FIG. 8B.

In step S707, the detection unit 324 determines whether or not the frame of interest is the final frame. If it is determined that the frame of interest is the final frame, the detection unit 324 ends the process and, if it is not the final frame, proceeds to step S708.

In step S708, the detection unit 324 focuses on the next frame and returns to step S701.

In the second embodiment, the display control unit 327 outputs a captured image on which the corrected detection result is superimposed. In the example of FIG. 8D and FIG. 9D, the display control unit 327 superimposes, on any of the upper, under, left, and right to the ellipse representing a detection result, one or more ellipses of the same size for the number of correction operations. Further, in the example of FIG. 10D, the display control unit 327 deletes the ellipse representing the detection result.

According to the second embodiment, since a detection result can be corrected when a subject which has been present near the boundary disappears or a subject newly appears near the boundary, it is possible to implement subject detection while further suppressing reduction in detection accuracy.

Third Embodiment

In the first embodiment, the process in which, in accordance with a capturing angle, the detection unit 324 divides a captured image into a region where subject detection based on an image feature is performed and a region where subject detection based on a factor other than an image feature is performed has been mainly described. However, the detection unit 324 may divide a region in accordance with on a user operation input via the input device 130 or the like. In a third embodiment, a process in which the detection unit 324 divides a region in accordance with the user operation input via the input device 130 or the like on a screen displayed on the display device 140 will be described.

Figure 11A:
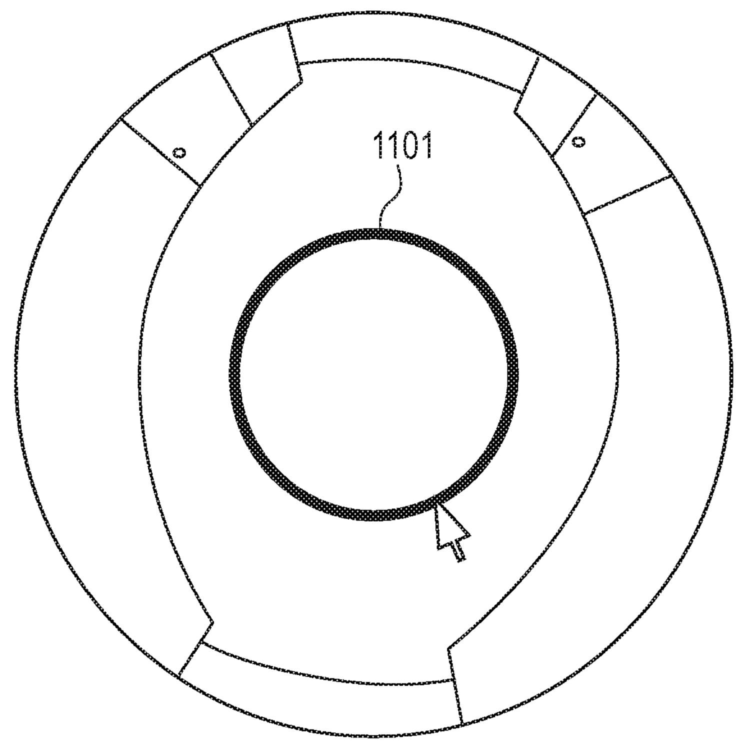
FIG. 11A and FIG. 11B are diagrams illustrating an example of an operating UI used for dividing a region.
Figure 11B:
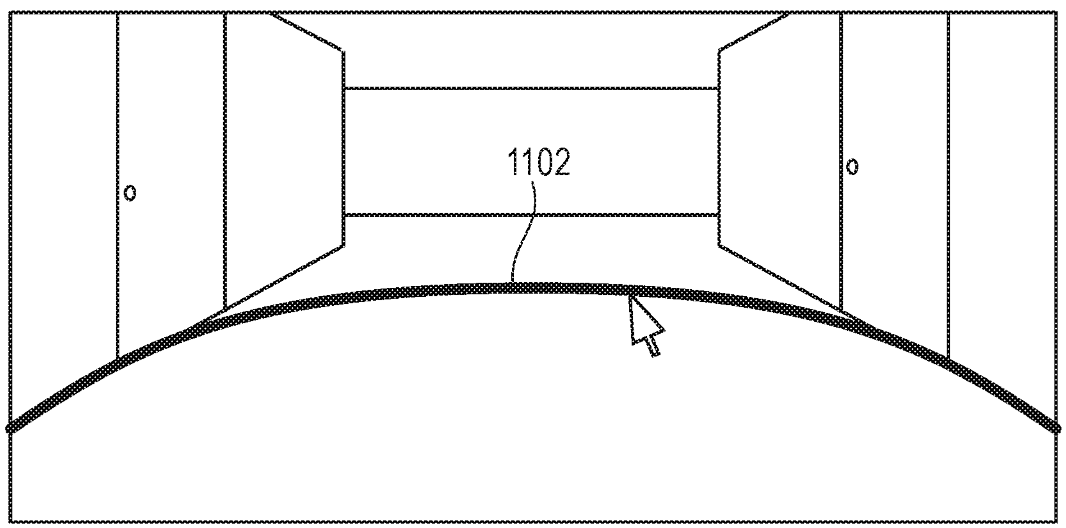
Figure 12A:
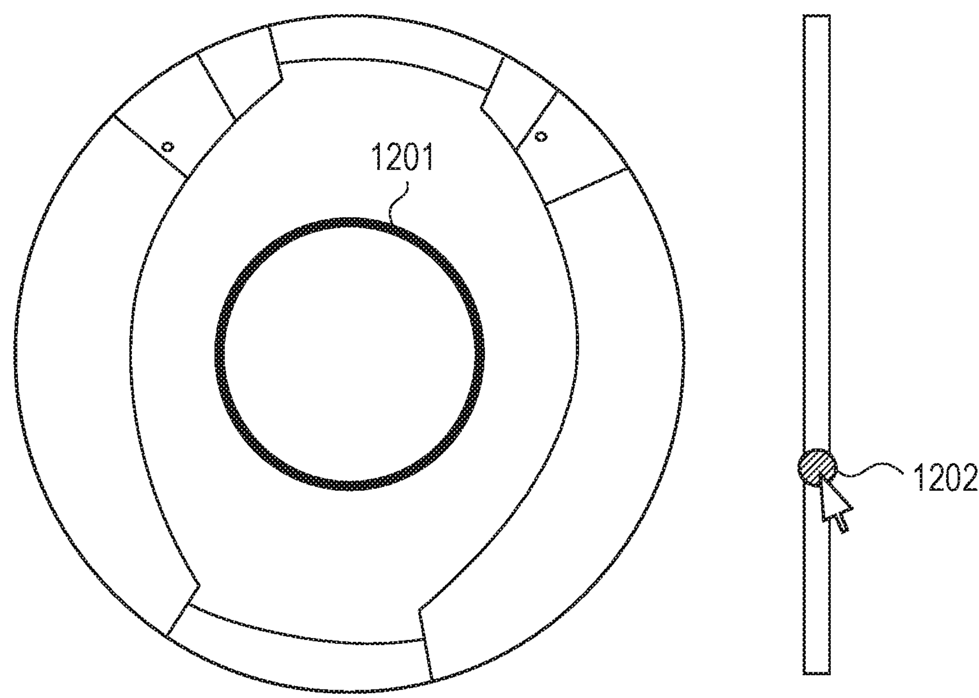
FIG. 12A and FIG. 12B are diagrams illustrating an example of an operating UI used for dividing a region.
Figure 12B:
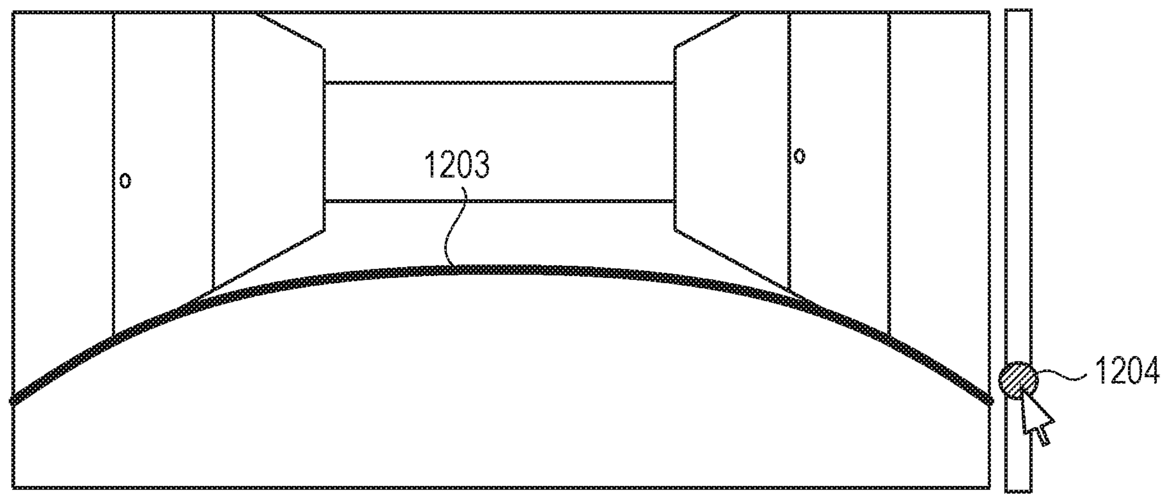

FIG. 11A, FIG. 11B, FIG. 12A, and FIG. 12B illustrate examples of an operating UI (screen) used for region division. The display control unit 327 displays an operating UI represented by FIG. 11A, FIG. 11B, FIG. 12A, or FIG. 12B on the display device 140 in response to a request. FIG. 11A and FIG. 12A represent an operating UI in an imaging device having a viewable angle of 180 degrees used in the first embodiment. FIG. 11B and FIG. 12B represent an operating UI in an imaging device having a viewable angle of less than or equal to 180 degrees. An operator 1101 in FIG. 11A and an operator 1102 in FIG. 11B each represent a boundary between regions and an operator used for operating the position of the boundary. That is, the display control unit 327 displays each operating UI illustrated in FIG. 11A, FIG. 11B, FIG. 12A, and FIG. 12B on the display device 140. The user is able to operate the position of a boundary between regions by dragging each of the operators 1101 and 1102 displayed on the display device 140 by using the input device 130 such as a mouse or the like. That is, the display control unit 327 changes the position of a boundary between regions in response to an operation on the operators 1101 and 1102 displayed on the display device 140, an operation such as dragging the operators 1101 and 1102 via the input device 130, or the like and displays the changed position. On the other hand, unlike the example of FIG. 11A and FIG. 11B, a boundary 1201 in FIG. 12A and a boundary 1203 in FIG. 12B each display only the boundary between regions. In FIG. 12A and FIG. 12B, the user is able to operate the position of a boundary between regions by dragging sliders 1202 and 1204 by using a mouse. That is, the display control unit 327 changes the position of a boundary between regions in response to an operation on the sliders 1202 and 1204 displayed on the display device 140, an operation such as shifting up or down the sliders 1202 and 1204 via the input device 130, or the like and displays the changed position.

According to the third embodiment, it is possible to divide a region in accordance with a user operation input via the input device 130 or the like.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a plurality of CPUs may be provided as the hardware configuration of the imaging device 110 and the client device 120, the plurality of CPUs may perform the process in accordance with a program stored in an auxiliary storage device or the like. Further, instead of the CPU, a graphics processing unit (GPU) may be used as the hardware configuration of the imaging device 110. Further, when an input unit, a display unit, and the like are provided in the imaging device 110, the function of the client device 120 described above may be implemented in the imaging device 110. The imaging device 110 in which the function of the client device 120 is implemented is an example of the information processing device. Further, the embodiments described above may be implemented in any suitable combination thereof.

According to each of the embodiments described above, accuracy of subject detection can be improved.

This application claims the benefit of Japanese Patent Application No. 2017-233227, filed Dec. 5, 2017, which is hereby incorporated by reference herein in its entirety.

What is claimed is:

1. An information processing device comprising:

an acquisition unit that acquires plural captured images including a first image captured at a first timing and a second image captured at a second timing different from the first timing;

an output unit that outputs a detection result of a first subject detection process based on an image feature, the first subject detection process being performed for a first region in the first image, and a detection result of a second subject detection process based on motion which is a factor other than the image feature, the second subject detection process being performed for a second region in the second image, the second region being different from the first region; and a correction unit that corrects, in accordance with a first number of detected subjects the subject detection result of the first subject detection process, a second number of detected subjects the subject detection result of the second subject detection process in a case where the first number of detected subjects is greater than the second number of detected subjects.

2. The information processing device according to claim 1, wherein the second subject detection process is a subject detection process using a moving-object detection across multiple ones of the captured images.

3. The information processing device according to claim 1, further comprising a dividing unit that divides the captured images into the first region and the second region.

4. The information processing device according to claim 3, wherein, in accordance with a capturing angle of each region of the captured image, the dividing unit divides the captured image into the first region where the first subject detection process is performed and the second region where the second subject detection process is performed.

5. The information processing device according to claim 3, wherein, in accordance with a user operation via a screen, the dividing unit divides the captured image into the first region where the first subject detection process is performed and the second region where the second subject detection process is performed.

6. The information processing device according to claim 5, further comprising a display unit that displays the screen.

7. The information processing device according to claim 5, wherein an operator usable by the user to operate a position of a boundary between the first region where the first subject detection process is performed and the second region where the second subject detection process is performed is displayed on the screen, and, in accordance with the user operation on the operator, the dividing unit divides the captured image into the first region where the first subject detection process is performed and the second region where the second subject detection process is performed.

8. The information processing device according to claim 5, wherein a slider usable by the user to operate a position of a boundary between the first region where the first subject detection process is performed and the second region where the second subject detection process is performed is displayed on the screen, and, in accordance with the user operation on the slider, the dividing unit divides the captured image into the first region where the first subject detection process is performed and the second region where the second subject detection process is performed.

9. The information processing device according to claim 1 further comprising:

a first detection unit that performs the first subject detection process, and a second detection unit that performs the second subject detection, wherein the output unit outputs a subject detection result obtained by the first detection unit and a subject detection result obtained by the second detection unit.

10. The information processing device according to claim 1, wherein the output unit superimposes, on a display of the captured images, the subject detection result of the first subject detection process based on the image feature and the subject detection result of the second subject detection process based on motion.

11. The information processing device according to claim 1, wherein the output unit superimposes, on a display of the captured images, a boundary between the first region where the first subject detection process based on the image feature is performed and the second region where the second subject detection process based on motion is performed.

12. The information processing device according to claim 1, wherein, in accordance with a distance between a subject detected by the first subject detection process and a subject detected by the second subject detection process, the correction unit corrects the second number of detected subjects.

13. A non-transitory storage medium including a program that causes a computer to function as each unit of the information processing device according to claim 1.

14. An information processing method comprising:

an acquisition step of acquiring plural captured images including a first image captured at a first timing and a second image captured at a second timing different from the first timing;

an output step of outputting a detection result of a first subject detection process based on an image feature, the first subject detection process being performed for a first region in the first image, and a detection result of a second subject detection process based on motion which is a factor other than the image feature, the second subject detection process being performed for a second region in the second image, the second region being different from the first region; and a correcting step of correcting, in accordance with a first number of detected subjects the subject detection result of the first subject detection process, a second number of detected subjects the subject detection result of the second subject detection process in a case where the first number of detected subjects is greater than the second number of detected subjects.

15. An information processing device comprising:

an acquisition unit that acquires plural captured images including a first image captured at a first timing and a second image captured at a second timing different from the first timing;

an output unit that outputs a detection result of a first subject detection process based on an image feature, the first subject detection process being performed for a first region in the first image, and a detection result of a second subject detection process based on motion which is a factor other than the image feature, the second subject detection process being performed for a second region in the second image, the second region being different from the first region; and a correction unit that corrects, in accordance with a second number of detected subjects the subject detection result of the second subject detection process, a first number of detected subjects the subject detection result of the first subject detection process in a case where the second number of detected subjects is greater than the first number of detected subjects.

16. The information processing device according to claim 15, wherein, in accordance with a distance between a subject detected by the first subject detection process and a subject detected by the second subject detection process, the correction unit corrects the first number of detected subjects.

* * * * *